United States Patent
Oka

(10) Patent No.: US 9,959,491 B2
(45) Date of Patent: May 1, 2018

(54) COLOR CONVERSION IN IMAGE PROCESSING APPARATUS, IMAGE PROCESSING METHOD AND INFORMATION PROCESSING APPARATUS, CONTROL METHOD THEREOF, AND NON-TRANSITORY COMPUTER-READABLE MEDIUM

(71) Applicant: CANON KABUSHIKI KAISHA, Tokyo (JP)

(72) Inventor: Hiroyuki Oka, Kashiwa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 56 days.

(21) Appl. No.: 14/962,658

(22) Filed: Dec. 8, 2015

(65) Prior Publication Data

US 2016/0210541 A1 Jul. 21, 2016

(30) Foreign Application Priority Data

Jan. 20, 2015 (JP) .................................. 2015-008956

(51) Int. Cl.
*G06F 15/00* (2006.01)
*G06K 15/02* (2006.01)
*H04N 1/60* (2006.01)

(52) U.S. Cl.
CPC ..... *G06K 15/1878* (2013.01); *G06K 15/1825* (2013.01); *H04N 1/603* (2013.01)

(58) Field of Classification Search
CPC . G06K 15/1878; G06K 15/1825; H04N 1/603
USPC ........................................................ 358/518
See application file for complete search history.

(56) References Cited

U.S. PATENT DOCUMENTS

| 8,031,365 | B2 | 10/2011 | Oka | 358/1.9 |
| 8,582,173 | B2 | 11/2013 | Kise | 358/1.9 |
| 2006/0232803 | A1* | 10/2006 | Hori | H04N 1/6058 358/1.9 |

FOREIGN PATENT DOCUMENTS

JP 2008-283423 11/2008
JP 5025323 B2 9/2012

* cited by examiner

*Primary Examiner* — Mark R Milia
(74) *Attorney, Agent, or Firm* — Fitzpatrick, Cella, Harper & Scinto

(57) ABSTRACT

An image processing apparatus decides a grid point coordinate on a lookup table corresponding to a predetermined color; calculates, based on association between a signal of the predetermined color in the uniform color space designated by a first color space information and the decided grid point coordinate, a first matrix for converting each signal in the uniform color space into a grid point coordinate; calculates, based on association between the signal of the predetermined color in the uniform color space designated by a second color space information and the decided grid point coordinate, a second matrix for converting each grid point coordinate into a signal in the uniform color space; and generates a lookup table for converting each grid point coordinate into a signal in the second color space by using the second matrix and the second color space information.

11 Claims, 8 Drawing Sheets

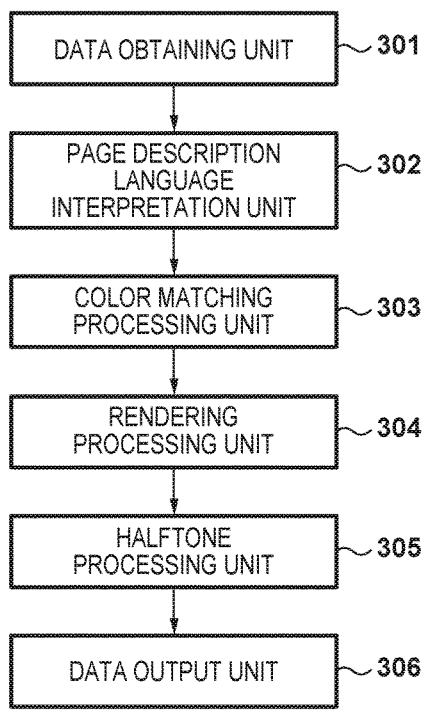
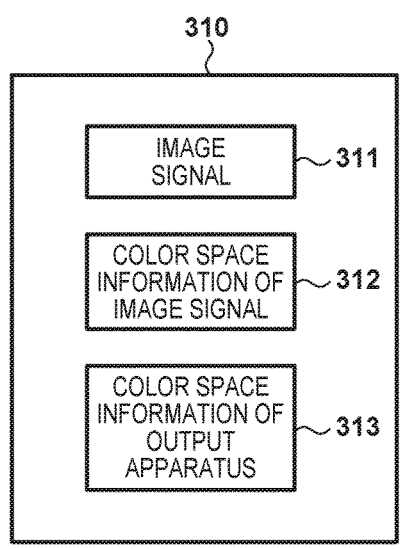
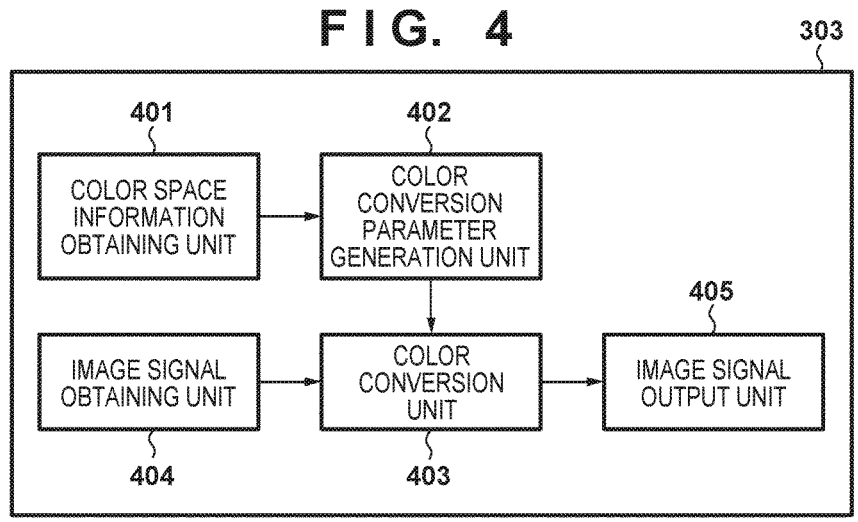

F I G. 6A
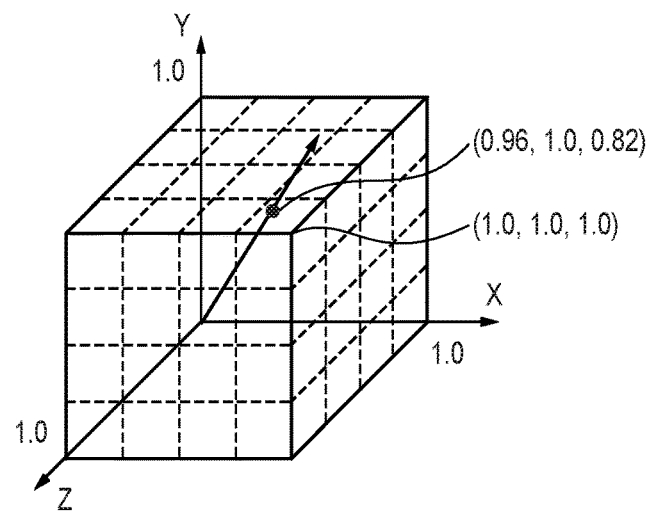
F I G. 6B
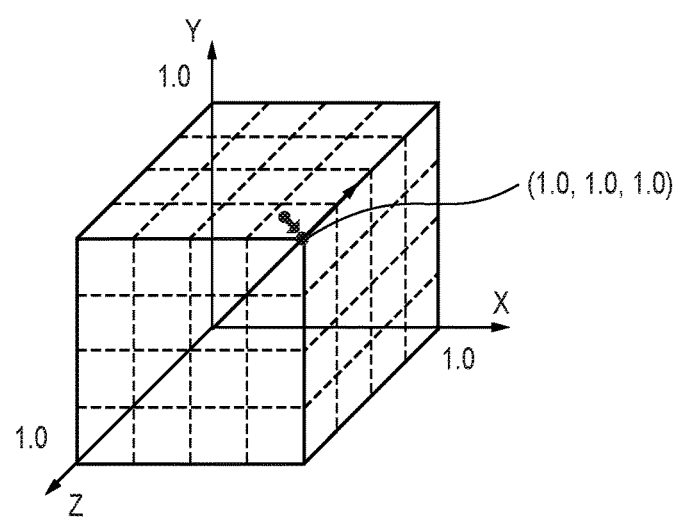

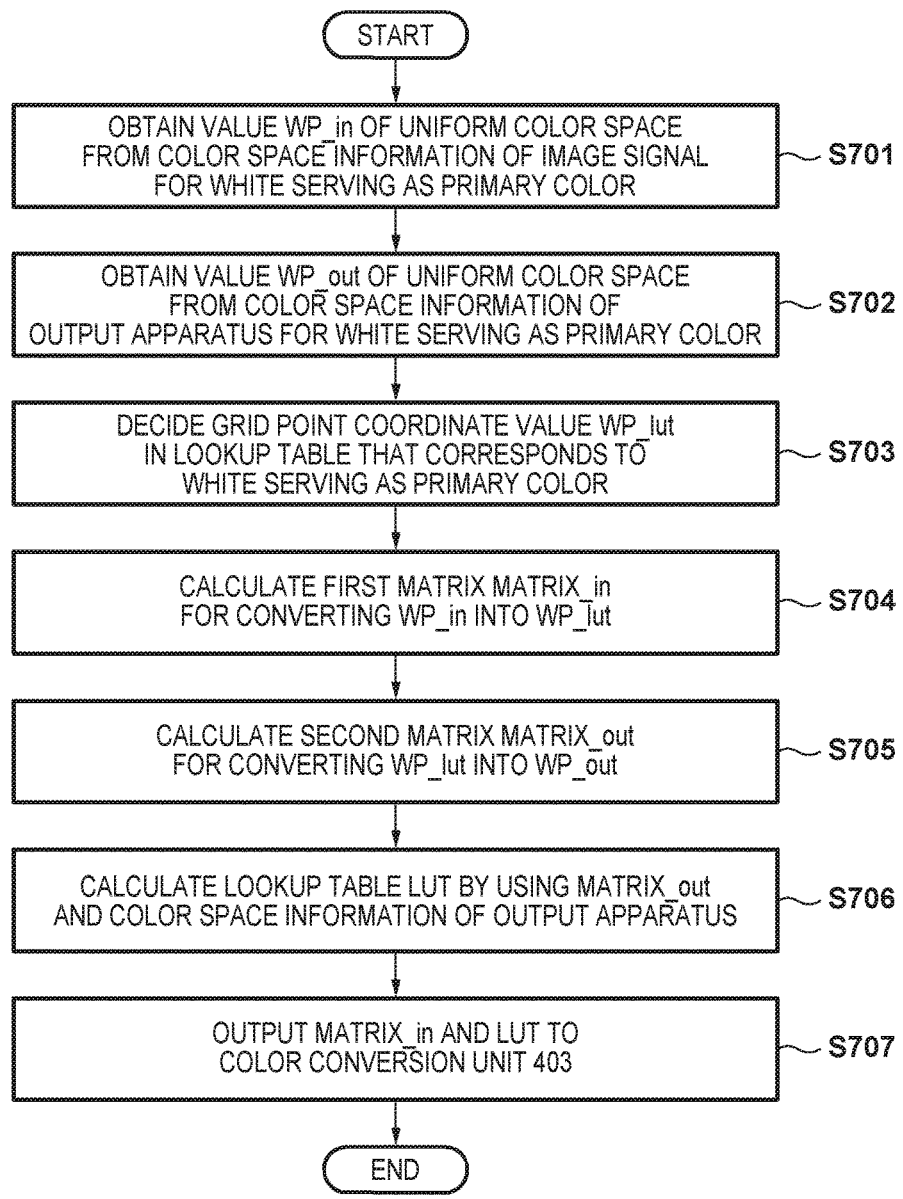

FIG. 11

| PRIMARY COLOR | GRID POINT COORDINATE | | |
|---|---|---|---|
| | CIE-X | CIE-Y | CIE-Z |
| WHITE | 1.0 | 1.0 | 1.0 |
| RED | 1.0 | 0.0 | 0.0 |
| GREEN | 0.0 | 1.0 | 0.0 |
| BLUE | 0.0 | 0.0 | 1.0 |

# COLOR CONVERSION IN IMAGE PROCESSING APPARATUS, IMAGE PROCESSING METHOD AND INFORMATION PROCESSING APPARATUS, CONTROL METHOD THEREOF, AND NON-TRANSITORY COMPUTER-READABLE MEDIUM

BACKGROUND OF THE INVENTION

Field of the Invention

The present invention relates to an image processing apparatus, an image processing method, an information processing apparatus, a control method thereof, and a non-transitory computer-readable medium and, more particularly, to color matching processing of converting an image signal of data described in a page description language into a signal in the color space of an output apparatus.

Description of the Related Art

Color space conversion (color matching) processing using color space information of an image signal and color space information of an output apparatus such as a printer is performed to convert an image signal of input data described in the page description language into a signal in the color space of the output apparatus. The color space information of the image signal includes a calculation equation for converting an image signal into a device-independent uniform color space (for example, a CIE-XYZ color space defined by Commission Internationale de l'Eclairage). The color space information of the output apparatus includes a calculation equation for converting a signal in the uniform color space into a signal in the color space of the output apparatus. By using these two pieces of information, the output apparatus converts an image signal into a signal in the color space of the output apparatus through the uniform color space.

However, the calculation equation is not directly used in actual conversion, and conversion is performed by interpolation calculation using a lookup table in which only the calculation results of some input signals are stored. This is because the calculation equation of color space information is generally complicated and processing takes time. However, in a method using the lookup table, when important colors (to be referred to as primary colors hereinafter) such as white, red, green, and blue do not coincide with the grid points of the lookup table, the values of the primary colors need to be calculated by interpolation calculation based on the grid points of colors other than pure colors. As a result, the quality of an image output by the output apparatus becomes poor. To solve this, Japanese Patent No. 5025323 discloses a method of assigning pure colors in an sRGB standard color space to grid points.

However, in the technique disclosed in Japanese Patent No. 5025323, primary colors cannot be assigned to grid points for image data of the page description language in which color space information other than standard one is described, thus degrading the image quality.

SUMMARY OF THE INVENTION

The present invention has been made to solve the above-described problems, and enables color matching processing without using interpolation calculation when obtaining the value of a primary color though a lookup table is used for an image signal based on arbitrary color space information.

According to one aspect of the present invention, there is provided an image processing apparatus comprising: an obtaining unit configured to obtain an image signal represented in a first color space, first color space information for converting the image signal into a signal in a uniform color space, and second color space information for converting the signal represented in the uniform color space into a signal in a second color space used when the image processing apparatus outputs the signal; a decision unit configured to decide a grid point coordinate value on a lookup table that corresponds to a predetermined color; a first calculation unit configured to associate a signal of the predetermined color in the uniform color space that is designated by the first color space information, with the grid point coordinate value decided by the decision unit, and calculate, based on the association, a first matrix for converting each signal in the uniform color space into a grid point coordinate value; a second calculation unit configured to associate the signal of the predetermined color in the uniform color space that is designated by the second color space information, with the grid point coordinate value decided by the decision unit, and calculate, based on the association, a second matrix for converting each grid point coordinate value into a signal in the uniform color space; a generation unit configured to generate a lookup table for converting each grid point coordinate value into a signal in the second color space by using the second matrix and the second color space information; and a color conversion unit configured to convert the image signal into the signal in the second color space by using the first matrix and the lookup table.

According to another aspect of the present invention, there is provided an image processing method comprising: obtaining an image signal represented in a first color space, first color space information for converting the image signal into a signal in a uniform color space, and second color space information for converting the signal represented in the uniform color space into a signal in a second color space used when an image processing apparatus outputs the signal; deciding a grid point coordinate value on a lookup table that corresponds to a predetermined color; associating a signal of the predetermined color in the uniform color space that is designated by the first color space information, with the grid point coordinate value decided in the deciding, and calculating, based on the association, a first matrix for converting each signal in the uniform color space into a grid point coordinate value; associating the signal of the predetermined color in the uniform color space that is designated by the second color space information, with the grid point coordinate value decided in the deciding, and calculating, based on the association, a second matrix for converting each grid point coordinate value into a signal in the uniform color space; generating a lookup table for converting each grid point coordinate value into a signal in the second color space by using the second matrix and the second color space information; and converting the image signal into the signal in the second color space by using the first matrix and the lookup table.

According to another aspect of the present invention, there is provided an information processing apparatus comprising: an obtaining unit configured to obtain first color space information for converting an image signal represented in a first color space into a signal in a uniform color space, and second color space information for converting the signal represented in the uniform color space into a signal in a second color space used when an output apparatus outputs the signal; a decision unit configured to decide a grid point coordinate value on a lookup table that corresponds to a predetermined color; a first calculation unit configured to associate a signal of the predetermined color in the uniform color space that is designated by the first color space information, with the grid point coordinate value decided by the decision unit, and calculate, based on the association, a first matrix for converting each signal in the uniform color space into a grid point coordinate value; a second calculation unit configured to associate the signal of the predetermined color in the uniform color space that is designated by the second color space information, with the grid point coordinate value decided by the decision unit, and calculate, based on the association, a second matrix for converting each grid point coordinate value into a signal in the uniform color space; and a generation unit configured to generate a lookup table for converting each grid point coordinate value into a signal in the second color space by using the second matrix and the second color space information.

According to another aspect of the present invention, there is provided a method of controlling an information processing apparatus, comprising: obtaining first color space information for converting an image signal represented in a first color space into a signal in a uniform color space, and second color space information for converting the signal represented in the uniform color space into a signal in a second color space used when an output apparatus outputs the signal; deciding a grid point coordinate value on a lookup table that corresponds to a predetermined color; associating a signal of the predetermined color in the uniform color space that is designated by the first color space information, with the grid point coordinate value decided in the deciding, and calculating, based on the association, a first matrix for converting each signal in the uniform color space into a grid point coordinate value; associating the signal of the predetermined color in the uniform color space that is designated by the second color space information, with the grid point coordinate value decided in the deciding, and calculating, based on the association, a second matrix for converting each grid point coordinate value into a signal in the uniform color space; and generating a lookup table for converting each grid point coordinate value into a signal in the second color space by using the second matrix and the second color space information.

According to another aspect of the present invention, there is provided a non-transitory computer-readable medium storing a program for causing a computer to function as: an obtaining unit configured to obtain an image signal represented in a first color space, first color space information for converting the image signal into a signal in a uniform color space, and second color space information for converting the signal represented in the uniform color space into a signal in a second color space used when the computer outputs the signal; a decision unit configured to decide a grid point coordinate value on a lookup table that corresponds to a predetermined color; a first calculation unit configured to associate a signal of the predetermined color in the uniform color space that is designated by the first color space information, with the grid point coordinate value decided by the decision unit, and calculate, based on the association, a first matrix for converting each signal in the uniform color space into a grid point coordinate value; a second calculation unit configured to associate the signal of the predetermined color in the uniform color space that is designated by the second color space information, with the grid point coordinate value decided by the decision unit, and calculate, based on the association, a second matrix for converting each grid point coordinate value into a signal in the uniform color space; a generation unit configured to generate a lookup table for converting each grid point coordinate value into a signal in the second color space by using the second matrix and the second color space information; and a color conversion unit configured to convert the image signal into the signal in the second color space by using the first matrix and the lookup table.

According to another aspect of the present invention, there is provided a non-transitory computer-readable medium storing a program for causing a computer to function as: an obtaining unit configured to obtain first color space information for converting an image signal represented in a first color space into a signal in a uniform color space, and second color space information for converting the signal represented in the uniform color space into a signal in a second color space used when an output apparatus outputs the signal; a decision unit configured to decide a grid point coordinate value on a lookup table that corresponds to a predetermined color; a first calculation unit configured to associate a signal of the predetermined color in the uniform color space that is designated by the first color space information, with the grid point coordinate value decided by the decision unit, and calculate, based on the association, a first matrix for converting each signal in the uniform color space into a grid point coordinate value; a second calculation unit configured to associate the signal of the predetermined color in the uniform color space that is designated by the second color space information, with the grid point coordinate value decided by the decision unit, and calculate, based on the association, a second matrix for converting each grid point coordinate value into a signal in the uniform color space; and a generation unit configured to generate a lookup table for converting each grid point coordinate value into a signal in the second color space by using the second matrix and the second color space information.

Color matching processing not using interpolation calculation when obtaining the value of a primary color though color conversion using a lookup table is performed on an image signal based on arbitrary color space information can be implemented.

Further features of the present invention will become apparent from the following description of exemplary embodiments (with reference to the attached drawings).

BRIEF DESCRIPTION OF THE DRAWINGS

FIGS. 3A and 3B are block diagrams showing an example of the configurations of an execution program and input data according to the first embodiment;

FIG. 4 is a block diagram showing an example of the arrangement of a color matching processing unit according to the first embodiment;

FIGS. 6A and 6B are views showing the relationship between a primary color (white) and the grid point coordinates of a lookup table;

FIG. 7 is a flowchart showing processing of a color conversion parameter generation unit according to the first embodiment;

FIG. 11 is a table showing a table that decides grid point coordinates corresponding to primary colors according to the second embodiment.

DESCRIPTION OF THE EMBODIMENTS

Embodiments of the present invention will now be described with reference to the accompanying drawings.

First Embodiment

The first embodiment will explain a form in which color matching processing not requiring interpolation calculation when obtaining the value of a predetermined color (white) defined as a primary color though a lookup table is used is executed.

[System Configuration]

Figure 1:
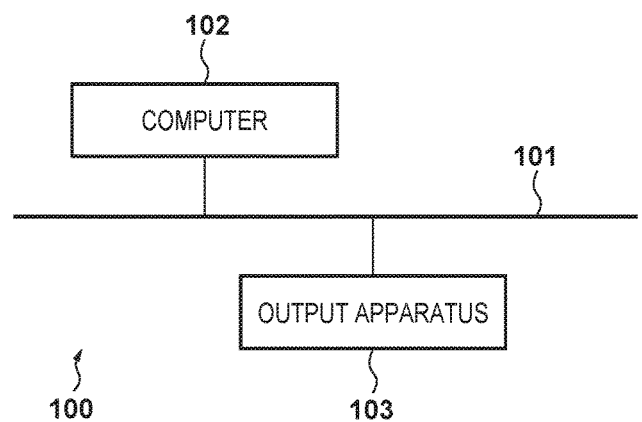
FIG. 1 is a block diagram showing an example of the configuration of an image processing system.

FIG. 1 shows an example of the configuration of an image processing system including an output apparatus as an image processing apparatus according to the embodiment. An image processing system 100 includes a computer 102 and an output apparatus 103. The computer 102 and the output apparatus 103 are connected so that they can communicate with each other via a data transmission line 101. The data transmission line 101 is arbitrarily wired or wireless. The computer 102 converts internally held document data into the format of the page description language, and transmits the converted data to the output apparatus 103 via the data transmission line 101. The type of data described in the page description language is arbitrary as long as "image signal", "color space information of the image signal", and "color space information of the output apparatus" are described. The color space information of the image signal includes a calculation equation for converting an image signal into a device-independent uniform color space (for example, CIE-XYZ color space defined by Commission Internationale de l'Eclairage), or its equivalent. The color space information of the output apparatus includes a calculation equation for converting a signal in a device-independent uniform color space into a signal in a color space used when the output apparatus outputs a signal, or its equivalent. An example of the color space information of the image signal and the color space information of the output apparatus is an ICC profile defined by International Color Consortium.

Figure 2:
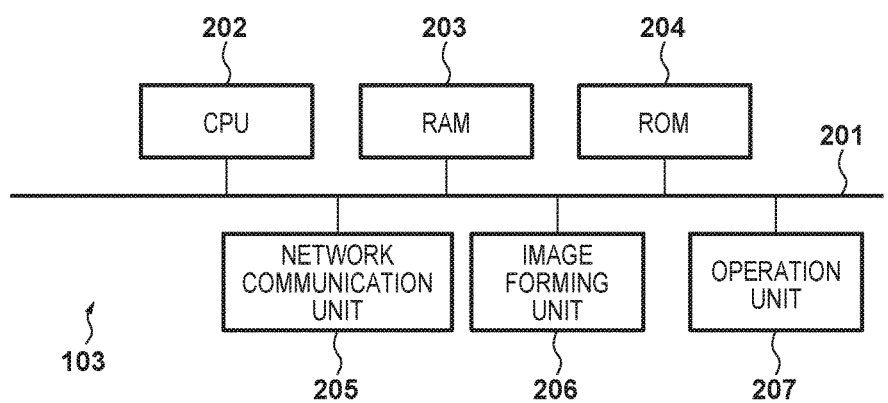
FIG. 2 is a block diagram showing an example of the hardware arrangement of an output apparatus.

FIG. 2 shows an example of the hardware arrangement of the output apparatus 103 according to the embodiment. The output apparatus 103 includes a data transmission bus 201, CPU 202, RAM 203, ROM 204, network communication unit 205, image forming unit 206, and operation unit 207. The CPU 202, RAM 203, ROM 204, network communication unit 205, and image forming unit 206 communicate instructions and data via the data transmission bus 201. The ROM 204 stores various programs to be executed by the CPU 202. The CPU 202 controls the overall output apparatus 103 and uses the RAM 203 as a work memory and image buffer necessary when executing programs. The operation unit 207 has a display function operable by the user, such as a touch panel form, displays a setting screen to the user, and receives a setting instruction from him. The network communication unit 205 is connected to the data transmission line 101. The CPU 202 receives data described in the page description language from the computer 102 serving as an external apparatus via the network communication unit 205. The CPU 202 converts received data into a binary screen signal corresponding to a color material (cyan, magenta, yellow, or black), and outputs the data to the image forming unit 206. Upon receiving the binary screen signal from the CPU 202, the image forming unit 206 performs image formation using each color material based on the binary screen signal.

FIG. 3A shows an example of the configuration of an execution program according to the embodiment. The execution program is executed by the CPU 202 to function as a data obtaining unit 301, page description language interpretation unit 302, color matching processing unit 303, rendering processing unit 304, halftone processing unit 305, and data output unit 306. In the embodiment, the computer 102 converts document data into the format of the page description language, generating input data 310 having a configuration in FIG. 3B. The input data 310 includes an image signal 311 indicating the value of an image to be printed, color space information 312 of the image signal 311, and color space information 313 in the output apparatus 103. Each color space information is designated by, for example, the user of the computer 102. For descriptive convenience, the color space information 312 of the image signal 311 will also be called the first color space information, and the color space information 313 in the output apparatus 103 will also be called the second color space information.

The CPU 202 controls the data obtaining unit 301 to obtain the input data 310 that has been received from the network communication unit 205 and is described in the page description language, and output the input data 310 to the page description language interpretation unit 302. The CPU 202 controls the page description language interpretation unit 302 to interpret the page description language of the input data 310, and output the image signal 311, the color space information 312 of the image signal, and the color space information 313 of the output apparatus to the color matching processing unit 303. The CPU 202 controls the color matching processing unit 303 to convert the image signal 311 into a signal (for example, a cyan, magenta, yellow, or black density signal) in the color space of the output apparatus 103 based on the color space information 312 of the image signal and the color space information 313 of the output apparatus. The CPU 202 outputs the converted signal to the rendering processing unit 304. The CPU 202 controls the rendering processing unit 304 to generate a raster image in which image signals of one page are bit-mapped, and output the raster image to the halftone processing unit 305. The CPU 202 controls the halftone processing unit 305 to convert the raster image into C, M, Y, and K binary screen signals, and output them to the data output unit 306. The CPU 202 controls the data output unit 306 to output the screen signals to the image forming unit 206.

FIG. 4 shows an example of the arrangement of the color matching processing unit 303 according to the embodiment. The color matching processing unit 303 includes a color space information obtaining unit 401, color conversion parameter generation unit 402, color conversion unit 403, image signal obtaining unit 404, and image signal output unit 405.

The CPU 202 controls the color space information obtaining unit 401 to obtain the color space information 312 of the image signal and the color space information 313 of the output apparatus by the page description language interpretation unit 302, and output them to the color conversion parameter generation unit 402. The CPU 202 controls the color conversion parameter generation unit 402 to generate a color conversion parameter in the color conversion unit 403 based on the color space information 312 of the image signal and the color space information 313 of the output apparatus, and output the color conversion parameter to the color conversion unit 403. Details of the color conversion parameter generation unit 402 will be described later. The CPU 202 controls the image signal obtaining unit 404 to obtain the image signal 311 from the page description language interpretation unit 302, and output it to the color conversion unit 403. The color conversion unit 403 performs color conversion on the image signal 311 based on the color conversion parameter, and outputs the processed image signal to the image signal output unit 405. Details of the color conversion unit 403 will be described later. The CPU 202 controls the image signal output unit 405 to output the image signal to the rendering processing unit 304.

[Mechanism of Assigning Primary Color to Grid Point of Lookup Table]

Before a description of details of the color conversion parameter generation unit 402 and color conversion unit 403, a mechanism of assigning a primary color to the grid point of a lookup table will be explained with reference to FIGS. 5A to 5D, 6A, and 6B.

Figure 5A:
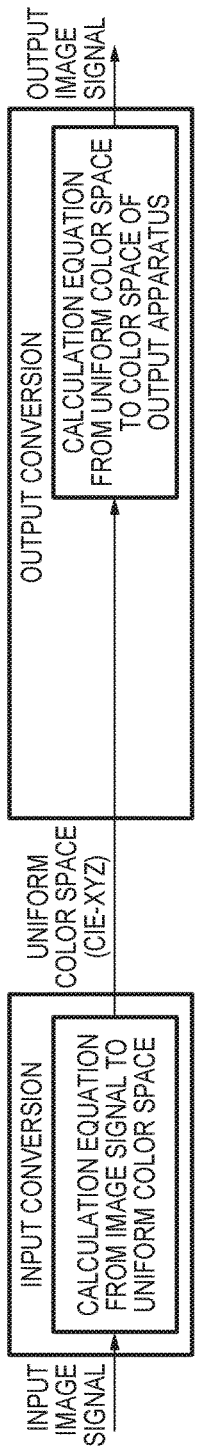
FIGS. 5A, 5B, 5C, and 5D are views showing the state of color conversion for explaining the mechanism of color conversion.
Figure 5B:
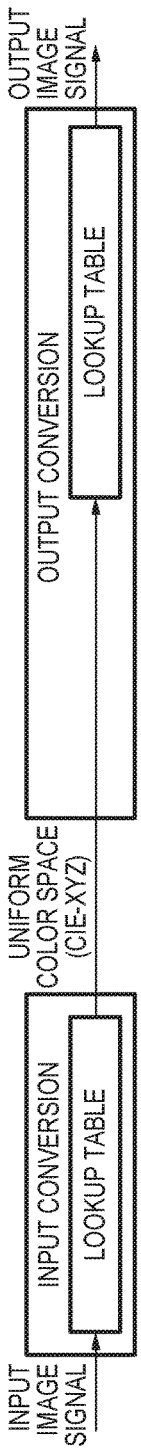

As described above, an image signal can be converted into a signal in the color space of the output apparatus through a device-independent uniform color space by using color space information of an image signal included in input data described in the page description language and color space information of the output apparatus. FIG. 5A shows the state of this calculation. However, when a calculation equation described in the color space information is complicated, processing takes time according to this method. The processing time can be shortened by performing interpolation calculation using a lookup table in which only the calculation results of some input signals are stored, as shown in FIG. 5B.

However, when interpolation calculation is performed using the lookup table, another problem arises. When the value, in the uniform color space, of white serving as a primary color in an image signal does not coincide with the grid point of the lookup table on the output conversion side, as shown in FIG. 6A, the value is calculated by interpolation calculation of surrounding grid points. The reason why interpolation calculation is problematic is that a pure color such as white has an extreme value in color reproduction of the output apparatus. That is, a pure color such as white cannot be calculated by interpolation calculation from the values of surrounding grid points, but a value obtained from surrounding colors needs to be handled as a pure color. For example, C, M, Y, and K density signals should be "0" for white, but white cannot be obtained by interpolation calculation from surrounding colors except white. In general, white calculated with color space information is often X=0.96, Y=1.0, and Z=0.82 (white at a color temperature of 5000 K), or X=0.95, Y=1.0, and Z=1.08 (white at a color temperature of 6500 K) in CIE-XYZ. These values do not coincide with a grid point because of the relationship with the granularity of grid points set in the lookup table. As a result, the value of the primary color (white in this case) needs to be obtained by interpolation calculation. In this case, if the CIE-XYZ values can be converted so that white serving as a primary color coincides with the grid point of white in the color temperature, as shown in FIG. 6B, this problem can be solved.

Figure 5C:
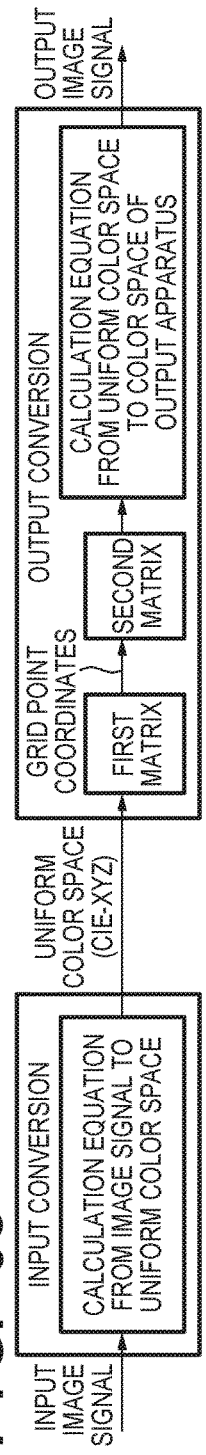

In the embodiment, the necessity of interpolation calculation on a primary color is obviated by assigning white serving as a primary color to a grip point of X=1.0, Y=1.0, and Z=1.0. To achieve this, two matrices are prepared on the output conversion side, as shown in FIG. 5C. The first matrix is a matrix for converting the value (for example, X=0.96, Y=1.0, and Z=0.82) of white of an image signal in the uniform color space into the coordinates (X=1.0, Y=1.0, and Z=1.0) of the grid point of white. The second matrix is a matrix for converting the coordinates (X=1.0, Y=1.0, and Z=1.0) of the grid point of white into the value (for example, X=0.95, Y=1.0, and Z=1.08) of white of the output apparatus in the uniform color space. An explanation will be made on the premise that the color temperature of white in the color space of an input image signal has 5000 K as a reference (50 D), and the color temperature of white in the color space of an output image signal (output apparatus) has 6500 K as a reference (65 D). However, the present invention is not limited to this, and the input and output may use the same color space. Alternatively, another color space may be used. It is also possible to define pieces of color space information as candidates in advance, and allow the user to select the color space of an output image signal via a user interface or the like.

Figure 5D:
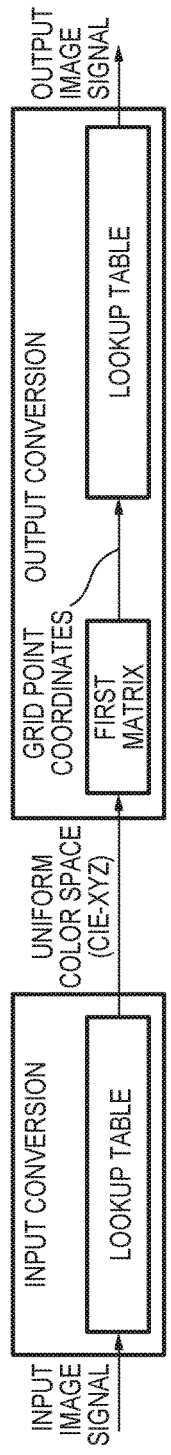

After performing color conversion based on these two matrices, a signal in the color space of the output apparatus can be calculated by solving a calculation equation for conversion into a signal in the color space of the output apparatus. Further, when the second matrix and the calculation result of the calculation equation for conversion into a signal in the color space of the output apparatus are replaced with a lookup table, as shown in FIG. 5D, the necessity of interpolation calculation on a primary color can be obviated while suppressing the processing time of color conversion.

[Processing by Color Conversion Parameter Generation Unit]

FIG. 7 is a flowchart showing processing of the color conversion parameter generation unit 402 according to the embodiment. This processing is implemented by reading out an execution program from a storage unit such as the ROM 204, and executing it by the CPU 202.

The CPU 202 obtains a value WP_in of the uniform color space from color space information of an image signal for white serving as a primary color (step S701). Then, the CPU 202 obtains a value WP_out of the uniform color space from color space information of the output apparatus for white serving as a primary color (step S702). The CPU 202 decides a grid point coordinate value WP_lut in the lookup table that is to be associated with white serving as a primary color (step S703). The coordinates of a grid point corresponding to white are defined in advance:

$$WP\_lut=(X\_lut, Y\_lut, Z\_lut)=(1.0, 1.0, 1.0)$$

The CPU 202 calculates a first matrix MATRIX_in for converting WP_in into WP_lut (step S704). Further, the CPU 202 calculates a second matrix MATRIX_out for converting WP_lut into WP_out (step S705).

The above-described calculation will be explained in more detail. An explanation will be made on the premise that CIE-XYZ is handled as the uniform color space, WP_in=(X_in, Y_in, Z_in), WP_out=(X_out, Y_out, Z_out), and WP_lut=(X_lut, Y_lut, Z_lut). First, the first matrix MATRIX_in for converting a WP_in value into WP_lut is calculated. MATRIX_in can be calculated by:

$$\text{MATRIX\_in} = \begin{pmatrix} \frac{X\_lut}{X\_in} & 0 & 0 \\ 0 & \frac{Y\_lut}{Y\_in} & 0 \\ 0 & 0 & \frac{Z\_lut}{Z\_in} \end{pmatrix} \quad (1)$$

Then, the second matrix MATRIX_out for converting a WP_lut value into WP_out is calculated. MATRIX_out can be calculated by:

$$MATRIX\_out = \begin{pmatrix} \frac{X\_out}{X\_lut} & 0 & 0 \\ 0 & \frac{Y\_out}{Y\_lut} & 0 \\ 0 & 0 & \frac{Z\_out}{Z\_lut} \end{pmatrix} \quad (2)$$

The CPU 202 calculates a lookup table LUT by using MATRIX_out and the color space information of the output apparatus (step S706). When coordinates obtained by dividing an input signal range of 0.0 to 1.0 in the lookup table by N (arbitrary integer) are set as the grid points of the lookup table, the grid point coordinates can be represented by (X, Y, Z)=(P/N, Q/N, R/N) (P, Q, and R are integers each of 0 to N). Each grid point coordinate is multiplied by MATRIX_out and converted into uniform color space information. Further, the uniform color space information is multiplied by the calculation equation of color space information of the output apparatus, calculating a signal value in the color space of the output apparatus that corresponds to the grid point coordinates. By calculating signal values in the color space of the output apparatus for all grid point coordinates, the lookup table LUT can be generated.

Finally, the CPU 202 outputs the first matrix MATRIX_in and the lookup table LUT to the color conversion unit 403 (step S707). The processing sequence then ends.

Note that the first matrix and lookup table generated in this processing sequence may be held in the storage unit or the like, and used for processing of newly input subsequent data. More specifically, the first matrix and lookup table can be used for processing of input data having the same combination of "color space information of the image signal" and "color space information of the output apparatus" among newly input data. In this case, the processing of the color conversion parameter generation unit 402 need not be executed every time the processing sequence is executed, so the processing load can be suppressed. In the embodiment, the output apparatus serving as an image processing apparatus reads out various execution programs and functions as the color conversion parameter generation unit 402 to generate the first matrix and lookup table. However, the present invention is not limited to this configuration. For example, another information processing apparatus may generate the first matrix and lookup table by using color space information of an image signal and color space information in the output apparatus.

[Processing of Color Conversion Unit]

Figure 8:
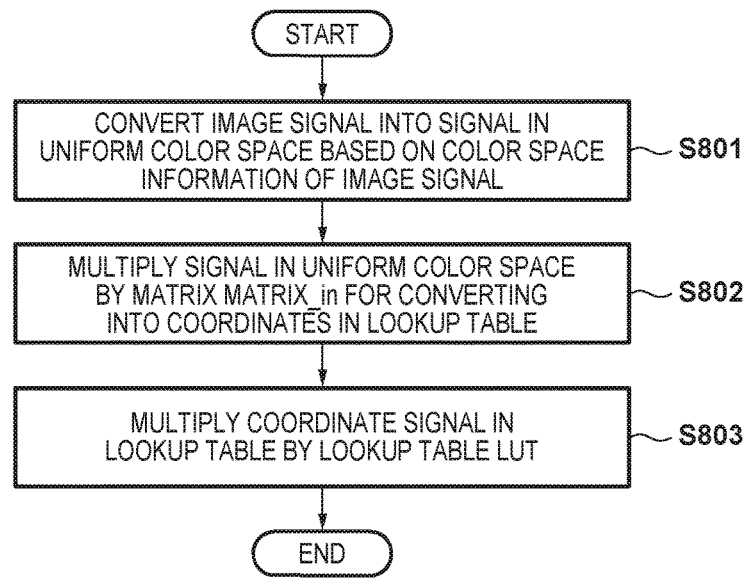
FIG. 8 is a flowchart showing processing of a color conversion unit according to the first embodiment.

FIG. 8 is a flowchart showing processing of the color conversion unit 403 according to the embodiment. This processing is implemented by reading out an execution program from a storage unit such as the ROM 204, and executing it by the CPU 202.

The CPU 202 converts an image signal into a signal in the uniform color space based on color space information of an image signal obtained from the page description language interpretation unit 302 (step S801). The CPU 202 multiplies the signal in the uniform color space by the first matrix MATRIX_in for conversion into coordinates in the lookup table (step S802). Accordingly, white serving as a primary color coincides with the grid point coordinates of white set in the lookup table LUT. The CPU 202 performs conversion using the lookup table LUT on an image signal corresponding to each coordinate value in the lookup table (step S803). The above-described processing is performed on all image signals in data described in the page description language. After that, this processing sequence ends.

As described above, white serving as a primary color coincides with the grid point of the lookup table, and color conversion is achieved without performing interpolation processing. As a result, the accuracy of color matching with respect to white serving as a primary color can be increased. Further, the processing load of color conversion processing can be suppressed.

Second Embodiment

The first embodiment has explained an example of color matching processing in which interpolation calculation is unnecessary for white serving as a primary color. The second embodiment will explain a form in which color matching processing not requiring interpolation calculation is executed not only for white serving as a primary color but also for two arbitrary pure colors.

The second embodiment is different from the first embodiment in only processing of an operation unit 207 and processing of a color conversion parameter generation unit 402. A description of an overlapping portion will not be repeated.

[Operation Unit]

Figure 9:
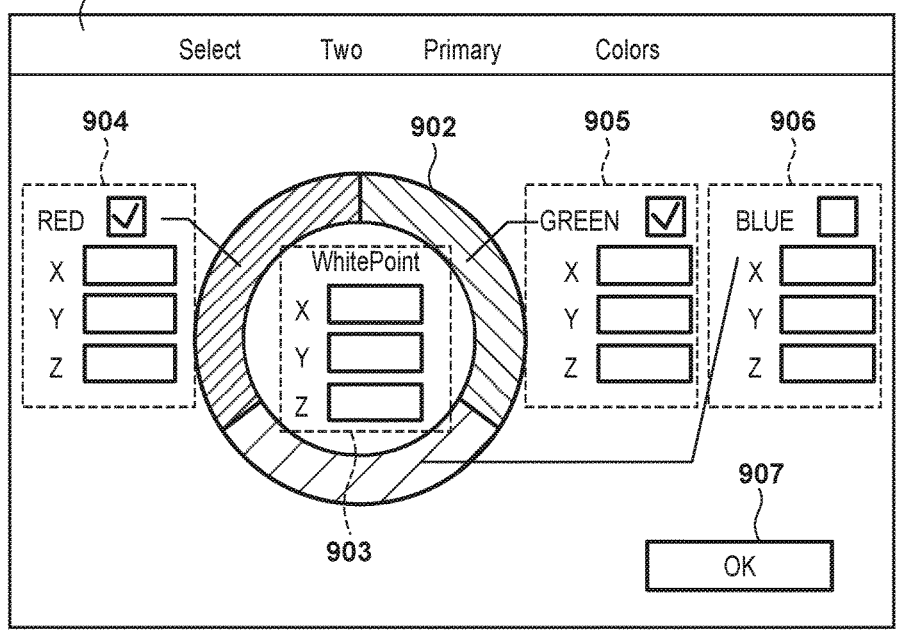
FIG. 9 is a view showing an example of the arrangement of the screen of an operation unit according to the second embodiment.

First, the operation unit 207 will be explained. The operation unit 207 displays a screen 901 shown in FIG. 9. In the screen 901, a circular ring 902 represents the image of a hue circle. The circular ring is divided into three to display red at an upper left portion, green at an upper right portion, and blue at a lower portion. A setting 903 can receive input of CIE-XYZ values (that is, X, Y, and Z values in a device-independent uniform color space) for white serving as a primary color. A setting 904 can receive an instruction (presence/absence of a check) of whether to designate red as a primary color, and input of CIE-XYZ values. A setting 905 can receive an instruction (presence/absence of a check) of whether to designate green as a primary color, and input of CIE-XYZ values. A setting 906 can receive an instruction (presence/absence of a check) of whether to designate blue as a primary color, and input of CIE-XYZ values. White is always employed as a primary color and in addition, designation of a maximum of two of red, green, and blue as primary colors is received from the user. The restriction in which up to two of red, green, and blue are designated in addition to white is put because conversion of the uniform color space and grid point coordinates is performed using a 3×3 matrix calculation in the embodiment. Since the present invention is not limited to the 3×3 matrix calculation, it is not always necessary to limit primary colors to up to two of red, green, and blue in addition to white. An OK button 907 is a button used to designate the completion of setting by the user. When the OK button 907 is pressed, the operation unit 207 notifies a CPU 202 of the completion of setting. In response to this, the CPU 202 obtains CIE-XYZ values for white and a maximum of two other primary colors from the operation unit 207 and stores the values in a RAM 203.

[Processing by Color Conversion Parameter Generation Unit]

Figure 10:
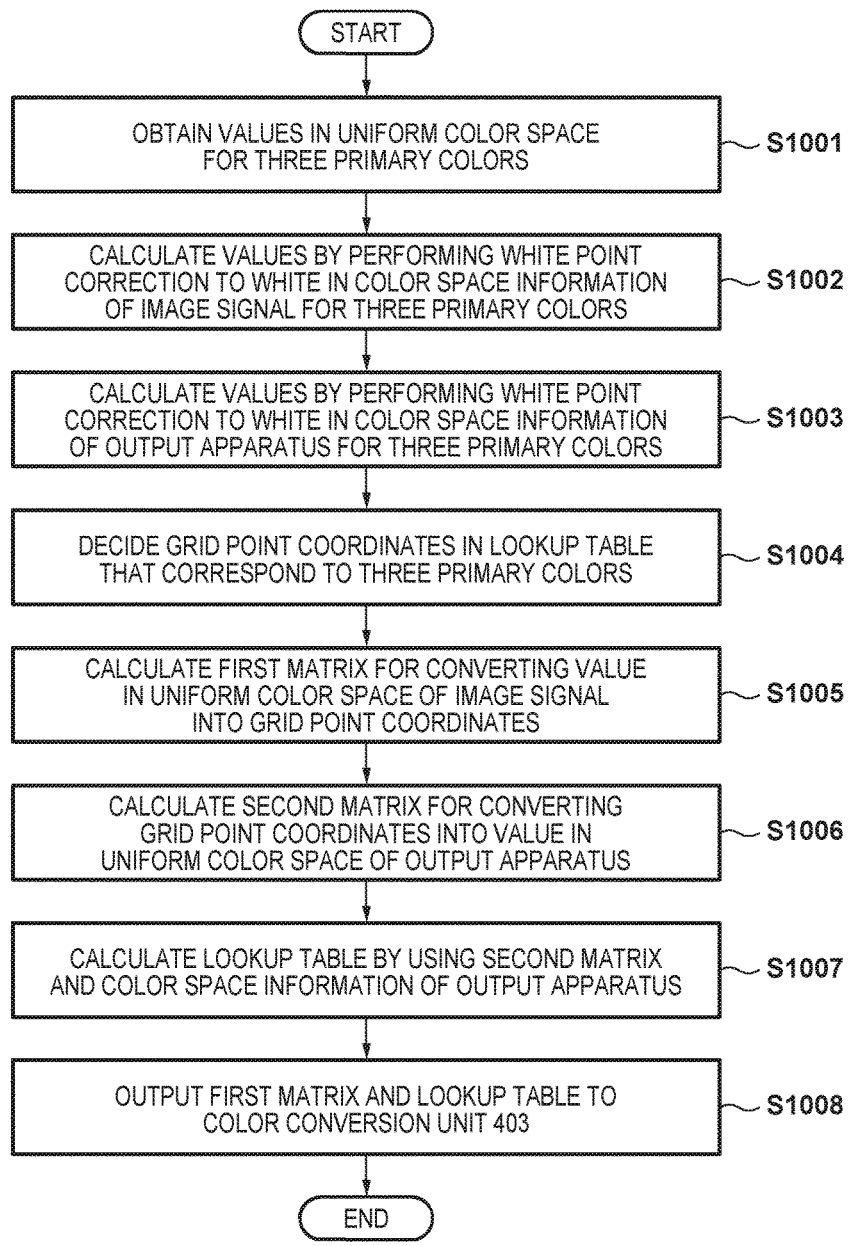
FIG. 10 is a flowchart showing processing of a color conversion parameter generation unit according to the second embodiment.

FIG. 10 is a flowchart showing processing of the color conversion parameter generation unit 402 according to the second embodiment. In the embodiment, an explanation will be made on the premise that two primary colors are designated in addition to white. This processing is implemented by reading out an execution program from a storage unit such as a ROM 204, and executing it by the CPU 202.

The CPU 202 obtains the values, in the uniform color space, of white and two other primary colors that are stored in the RAM 203 (step S1001). The obtained values are values designated by the user via the operation unit 207.

For white and the two other primary colors, the CPU 202 calculates values by performing white point correction to white in color space information of an image signal (step S1002). The color space information of the image signal describes the value of white in the uniform color space. For example, X=0.96, Y=1.0, and Z=0.82 (white at a color temperature of 5000 K), or X=0.95, Y=1.0, and Z=1.08 (white at a color temperature of 6500 K) are described in CIE-XYZ. When the value of white serving as a primary color that has been designated by the user via the operation unit 207 is different from the value of white in the color space information of the image signal, correction (to be referred to as "white point correction") is necessary by the difference for the two primary colors except white. More specifically, assume that the value of white designated by the user is (Xw, Yw, Zw), the value of white in the color space information of the image signal is (Xt, Yt, Zt), and the value of the primary color is (X, Y, Z). A value (X', Y', Z') after applying white point correction to a designated primary color can be calculated by:

$$\begin{pmatrix} X' \\ Y' \\ Z' \end{pmatrix} = \begin{pmatrix} \frac{Xt}{Xw} & 0 & 0 \\ 0 & \frac{Yt}{Yw} & 0 \\ 0 & 0 & \frac{Zt}{Zw} \end{pmatrix} \begin{pmatrix} X \\ Y \\ Z \end{pmatrix} \quad (3)$$

As for white and the two other primary colors, the CPU 202 calculates values by performing white point correction to white in color space information of the output apparatus (step S1003). The color space information of the output apparatus describes the value of white in the uniform color space, as in the color space information of the image signal. When the value of white serving as a primary color that has been designated by the user is different from the value of white in the color space information of the output apparatus, white point correction is necessary by the difference for the two primary colors except white. Equation (3) can be used in this calculation, as in step S1002.

Then, as for white and the two other primary colors, the CPU 202 decides grid point coordinates in the lookup table that stores the density signal of the output apparatus (step S1004). For example, grid point coordinates are decided based on a table shown in FIG. 11. Assume that grid point coordinates used here are defined in advance for respective colors and held in the storage unit.

Thereafter, the CPU 202 calculates the first matrix for converting a value in the uniform color space of an image signal into grid point coordinates (step S1005). This calculation will be explained in detail. Assume that the values of white and the two other primary colors having undergone white point correction in step S1002 are (X'1, Y'1, Z'1), (X'2, Y'2, Z'2), and (X'3, Y'3, Z'3), respectively. Also, assume that grid point coordinates are (X11, Y11, Z11), (X12, Y12, Z12), and (X13, Y13, Z13). Then, a first matrix Pij (i and j are 1 to 3) can be calculated by solving simultaneous equations:

$$\begin{pmatrix} Xl1 & Xl2 & Xl3 \\ Yl1 & Yl2 & Yl3 \\ Zl1 & Zl2 & Zl3 \end{pmatrix} = \begin{pmatrix} P11 & P12 & P13 \\ P21 & P22 & P23 \\ P31 & P32 & P33 \end{pmatrix} \begin{pmatrix} X'1 & X'2 & X'3 \\ Y'1 & Y'2 & Y'3 \\ Z'1 & Z'2 & Z'3 \end{pmatrix} \quad (4)$$

The signal values of white and the two other primary colors represent white and colors out of red, green, and blue (total of three colors), and have a linearly independent relationship in the CIE-XYZ color space. Thus, simultaneous equations (4) always have a solution.

Then, the CPU 202 calculates the second matrix for converting grid point coordinates into a value in the uniform color space of the output apparatus (step S1006). Assume that the values of white and the two other primary colors having undergone white point correction to the color space of the output apparatus in step S1003 are (X''1, Y''1, Z''1), (X''2, Y''2, Z''2), and (X''3, Y''3, Z''3), respectively. Also, assume that grid point coordinates are (X11, Y11, Z11), (X12, Y12, Z12), and (X13, Y13, Z13). Then, a second matrix Qij (i and j are 1 to 3) can be calculated by solving simultaneous equations:

$$\begin{pmatrix} X''1 & X''2 & X''3 \\ Y''1 & Y''2 & Y''3 \\ Z''1 & Z''2 & Z''3 \end{pmatrix} = \begin{pmatrix} Q11 & Q12 & Q13 \\ Q21 & Q22 & Q23 \\ Q31 & Q32 & Q33 \end{pmatrix} \begin{pmatrix} Xl1 & Xl2 & Xl3 \\ Yl1 & Yl2 & Yl3 \\ Zl1 & Zl2 & Zl3 \end{pmatrix} \quad (5)$$

The signal values of white and the two other primary colors represent white and colors out of red, green, and blue, and have a linearly independent relationship in the CIE-XYZ color space. Therefore, simultaneous equations (5) always have a solution.

Thereafter, the CPU 202 calculates a lookup table by using the second matrix and the color space information of the output apparatus (step S1007). This processing is the same as the processing in step S5706 of FIG. 7 described in the first embodiment.

Finally, the CPU 202 outputs the first matrix and the lookup table to a color conversion unit 403 (step S1008). The processing sequence then ends.

Note that a maximum of two of red, green, and blue as primary colors, in addition to white, are assigned to the grid points of the lookup table. However, the present invention is not limited to this, and a larger number of colors may be assigned to grid points. This can be coped with by extending the size of the matrix calculation.

As described above, according to the second embodiment, not only white but also even a maximum of two arbitrary pure colors as primary colors undergo color conversion using the grid points of the lookup table. As a result, the accuracy of color material can be increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-008956, filed Jan. 20, 2015, which is hereby incorporated by reference herein in its entirety.

What is claimed is:

1. An image processing apparatus comprising:
a processor and a memory storing computer code that, when executed by the processor, causes the image processing apparatus to:
obtain a first signal that is a signal in a uniform color space by converting a signal corresponding to a predetermined color of an input image signal;
obtain a second signal that is a signal in a uniform color space by converting a signal corresponding to the predetermined color of a signal in a color space used by the image processing apparatus;
decide a grid point coordinate value on a lookup table that corresponds to the predetermined color;
associate a signal of the predetermined color in the uniform color space that is obtained as the first signal, with the decided grid point coordinate value, and based on the association calculate a first matrix for converting each signal in the uniform color space into a grid point coordinate value;
associate the signal of the predetermined color in the uniform color space that is obtained as the second signal, with the decided grid point coordinate value, and based on the association calculate a second matrix for converting each grid point coordinate value into a signal in the uniform color space;
generate a lookup table for converting each grid point coordinate value into a signal in the color space used by the image processing apparatus by using the second matrix and color space information for converting a signal in the uniform color space into a signal in the color space used by the image processing apparatus; and
convert the input image signal into the signal in the color space used by the image processing apparatus by using the first matrix and the lookup table, to print the converted input image signal.

2. The apparatus according to claim 1, wherein the predetermined color includes white or a plurality of types of colors including white.

3. The apparatus according to claim 2, wherein the computer code, when executed by the processor, causes the image processing apparatus to receive designation of a type of the predetermined color.

4. The apparatus according to claim 3, wherein a value of a signal of the predetermined color in the uniform color space is further received.

5. The apparatus according to claim 4, wherein the computer code, when executed by the processor, causes the image processing apparatus to, if a value of a signal of white in the uniform color space that has been received is different from a value of a signal of white in the uniform color space that is obtained as the first signal value, correct, based on a difference between the values, a value of a signal of a predetermined color other than white in the uniform color space that has been designated,
wherein calculation of matrices is performed using the value of the signal corrected.

6. The apparatus according to claim 2, wherein the grid point coordinate value decided is defined in advance for each type of the predetermined color.

7. The apparatus according to claim 1, wherein a signal of white represented as the first signal and a signal of white represented as the second signal are identical.

8. The apparatus according to claim 1, wherein a signal of white represented as the first signal and a signal of white represented as the second signal are different.

9. The apparatus according to claim 1, wherein pieces of color space are defined as candidates of the color space used by the image processing apparatus, and
the computer code, when executed by the processor, causes the image processing apparatus to receive a selection of the color space used by the image processing apparatus from the pieces of color space.

10. An image processing method for an image processing apparatus comprising:
obtaining a first signal that is a signal in a uniform color space by converting a signal corresponding to a predetermined color of an input image signal;
obtaining a second signal that is a signal in a uniform color space by converting a signal corresponding to the predetermined color of a signal in a color space used by the image processing apparatus;
deciding a grid point coordinate value on a lookup table that corresponds to the predetermined color;
associating a signal of the predetermined color in the uniform color space that is obtained as the first signal, with the decided grid point coordinate value, and based on the association calculating a first matrix for converting each signal in the uniform color space into a grid point coordinate value;
associating the signal of the predetermined color in the uniform color space that is obtained as the second signal, with the grid point coordinate value decided, and based on the association calculating a second matrix for converting each grid point coordinate value into a signal in the uniform color space;
generating a lookup table for converting each grid point coordinate value into a signal in the color space used by the image processing apparatus by using the second matrix and color space information for converting a signal in the uniform color space into a signal in the color space used by the image processing apparatus; and converting the input image signal into the signal in the color space used by the image processing apparatus by using the first matrix and the lookup table, to print the converted input image signal.

11. A non-transitory computer-readable medium storing a program for causing a computer to:

obtain a first signal that is a signal in a uniform color space by converting a signal corresponding to a predetermined color of an input image signal;

obtain a second signal that is a signal in a uniform color space by converting a signal corresponding to the predetermined color of a signal in a color space used by the computer;

decide a grid point coordinate value on a lookup table that corresponds to the predetermined color;

associate a signal of the predetermined color in the uniform color space that is obtained as the first signal, with the decided grid point coordinate value, and based on the association calculate a first matrix for converting each signal in the uniform color space into a grid point coordinate value;

associate the signal of the predetermined color in the uniform color space that is obtained as the second signal, with the grid point coordinate value decided, and based on the association calculate a second matrix for converting each grid point coordinate value into a signal in the uniform color space;

generate a lookup table for converting each grid point coordinate value into a signal in the color space used by the computer by using the second matrix and color space information for converting a signal in the uniform color space into a signal in the color space used by the computer; and convert the input image signal into the signal in the color space used by the computer by using the first matrix and the lookup table, to print the converted input image signal.

* * * * *